United States Patent
Suzuki et al.

(10) Patent No.: US 11,198,204 B2
(45) Date of Patent: Dec. 14, 2021

(54) TOOL PATH GENERATION METHOD

(71) Applicant: MAKINO MILLING MACHINE CO., LTD., Tokyo (JP)

(72) Inventors: Kyohei Suzuki, Kanagawa (JP); Kouji Ono, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 16/978,504

(22) PCT Filed: Mar. 9, 2018

(86) PCT No.: PCT/JP2018/009335
§ 371 (c)(1),
(2) Date: Sep. 4, 2020

(87) PCT Pub. No.: WO2019/171599
PCT Pub. Date: Sep. 12, 2019

(65) Prior Publication Data
US 2020/0398397 A1 Dec. 24, 2020

(51) Int. Cl.
*B23Q 15/14* (2006.01)
*B23Q 15/013* (2006.01)

(52) U.S. Cl.
CPC .......... *B23Q 15/14* (2013.01); *B23Q 15/013* (2013.01)

(58) Field of Classification Search
None
See application file for complete search history.

(56) References Cited

U.S. PATENT DOCUMENTS 4,789,931 A * 12/1988 Kuragano .............. G05B 19/41
700/176
5,008,806 A * 4/1991 Seki .................. G05B 19/4099
700/183

FOREIGN PATENT DOCUMENTS

JP 2007-94955 4/2007

* cited by examiner

*Primary Examiner* — Ryan A Jarrett
(74) *Attorney, Agent, or Firm* — Morrison & Foerster LLP (57) ABSTRACT

This method for generating a tool path for processing a workpiece is provided with: a step for setting a first reference plane with respect to the workpiece; a step for setting, with respect to the workpiece, a second reference plant which is not parallel to the first reference plane; a step for interpolating, on the basis of the first reference plane and the second reference plane, a plurality of third reference planes, which are not parallel to each other, between the first reference plane and the second reference plane; a step in which partial tool paths for processing the workpiece are generated for each of the plurality of third reference planes on the basis of the corresponding third reference plane; and a step for generating a tool path by sequentially connecting the partial tool paths of the plurality of third reference planes.

4 Claims, 12 Drawing Sheets

TOOL PATH GENERATION METHOD

CROSS REFERENCE TO RELATED APPLICATIONS

This application is a US National Stage Application under 35 USC 371 of International Patent Application No. PCT/JP2018/009335, filed on Mar. 9, 2018, the entire contents of which is incorporated herein by reference.

FIELD OF THE DISCLOSURE

The present invention relates to a method for generating a tool path for a machine tool which machines a workpiece by moving a tool and the workpiece relative to each other.

BACKGROUND OF THE DISCLOSURE

Machine tools perform machining in accordance with a provided machine program. When the machine tool is a machining center, the machine program is described so that a tool which is rotated by a spindle moves along a tool path, which is a path along which the tool moves relative to a workpiece. The tool path can be any of an infinite number of paths, but the efficiency and accuracy of machining change greatly depending on the tool path. Furthermore, a tool path may or may not be suitable depending on the shape of the workpiece. Thus, it is desirable to generate an appropriate tool path according to the shape of the workpiece. In order to determine a more suitable tool path, a CAM (Computer Aided Manufacturing) device is used, and the CAM device determines an appropriate tool path from the shape of the workpiece and generates a machine program in consideration of machining conditions. Various patterns are known regarding tool path patterns, including a contour path. In machining in which contour paths are used, the tool machines the surface with contour motions. Such contour machining can be applied to various workpieces. For example, Patent Literature 1 discloses a method for generating a mold by contour machining. In the generation of NC data, in order to generate contour line paths, one machining locus is generated in each of a plurality of XZ planes set along the Y-axis direction.

PATENT LITERATURE

[PTL 1] Japanese Unexamined Patent Publication (Kokai) No. 2007-94955

BRIEF SUMMARY OF THE DISCLOSURE

When a workpiece is machined by contour machining, in some workpieces, both ends in the height direction (the direction in which a plurality of contour lines are arranged) may have reference planes that are not parallel to each other. In such a case, contour lines may not be set parallel to one of the reference planes, or to both of the reference planes. In this case, the end having reference plane which is non-parallel to the contour lines must be machined with a plurality of contour lines, which can lead to disadvantages such as long machining time and rough surfaces.

The present invention aims to provide a method for generating a tool path which is suitable for a workpiece having conflicting reference planes which are not parallel to each other.

An aspect of the present disclosure provides a tool path generation method for generating a tool path for machining a workpiece, the method comprising the steps of setting a first reference plane with respect to the workpiece, setting a second reference plane that is not parallel to the first reference plane, with respect to the workpiece, interpolating, based on the first reference plane and the second reference plane, a plurality of third reference planes that are not parallel to each other, between the first reference plane and the second reference plane, generating, with respect to each of the plurality of third reference planes, a partial tool path for machining the workpiece, based on the corresponding third reference plane, and generating a tool path by sequentially connecting the partial tool paths of the plurality of third reference planes.

According to the aspect of the present disclosure, a plurality of third reference planes which are not parallel to each other are set with respect to the workpiece, and based on the plurality of third reference planes, a plurality of non-parallel partial tool paths are generated. Thus, partial tool paths which are parallel to each other can be set with respect to the conflicting surfaces which are not parallel to each other. Therefore, a tool path which is suitable for a workpiece having conflicting surfaces which are not parallel to each other can be generated.

The tool may have a tool reference point that follows the tool path, and each partial tool path may be generated by calculating a contact position between the workpiece and the tool so that the tool reference point is positioned within the corresponding third reference plane. In this case, each partial tool path can be generated based on the tool reference point.

Furthermore, each partial tool path may be generated by offsetting a contour of the workpiece by a distance between a contact position between the workpiece and the tool and the tool reference point so that the contact position is within the corresponding third reference plane. In this case, each partial tool path can be generated based on the contact position between the workpiece and the tool.

The first reference plane may have a first inclination, the second reference plane may have a second inclination, the method may further comprise a step of setting a first reference point with respect to the first reference plane and a step of setting a second reference point with respect to the second reference plane, the step of interpolating the plurality of third reference planes may comprise determining the plurality of third reference planes so that the plurality of third reference planes include a plurality of third reference points which are evenly interpolated between the first reference point and the second reference point and the plurality of third reference planes have a plurality of third inclinations which are evenly interpolated between the first inclination and the second inclination, and the step of generating the tool path may comprise generating a helical tool path by connecting the partial tool paths of adjacent third reference planes. In this case, a smooth tool path can be generated.

According to the present invention, a tool path which is suitable for a workpiece having conflicting reference planes which are not parallel to each other can be generated.

DETAILED DESCRIPTION OF THE DISCLOSURE

The method for generating a tool path according to the embodiments will be described below with reference to the attached drawings. Identical or corresponding elements have been assigned the same reference signs, and duplicate descriptions thereof have been omitted. In order to facilitate understanding, the scales of the drawings may be changed in some cases.

Figure 1:
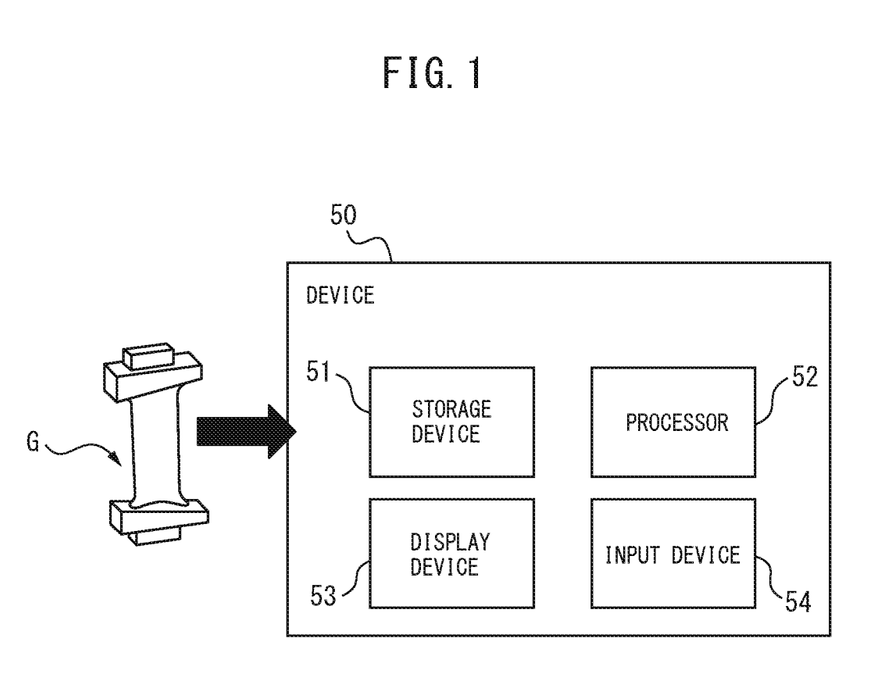
FIG. 1 is a block diagram illustrating a device for executing the method of the present disclosure.

FIG. 1 is a block diagram illustrating a device for executing the method of the present disclosure. The present disclosure provides a method for generating a tool path for the machining of a workpiece by an NC machine. The method of the present disclosure can be executed by a device 50, which is a computer, server, tablet, or some other computing device. The device 50 can comprise components such as a storage device 51 (e.g., a hard disk), a processor 52 (e.g., a CPU), a display device 53 (e.g., a liquid crystal display or a touch panel), an input device 54 (e.g., a mouse, a keyboard and/or a touch panel), ROM (read-only memory) (not illustrated), and/or RAM (random access memory) (not illustrated), and these components can be connected to each other via busses (not illustrated). The method of the present disclosure can be executed by, for example, a CAM (Computer Aided Manufacturing) system incorporated in the device 50.

Figure 2:
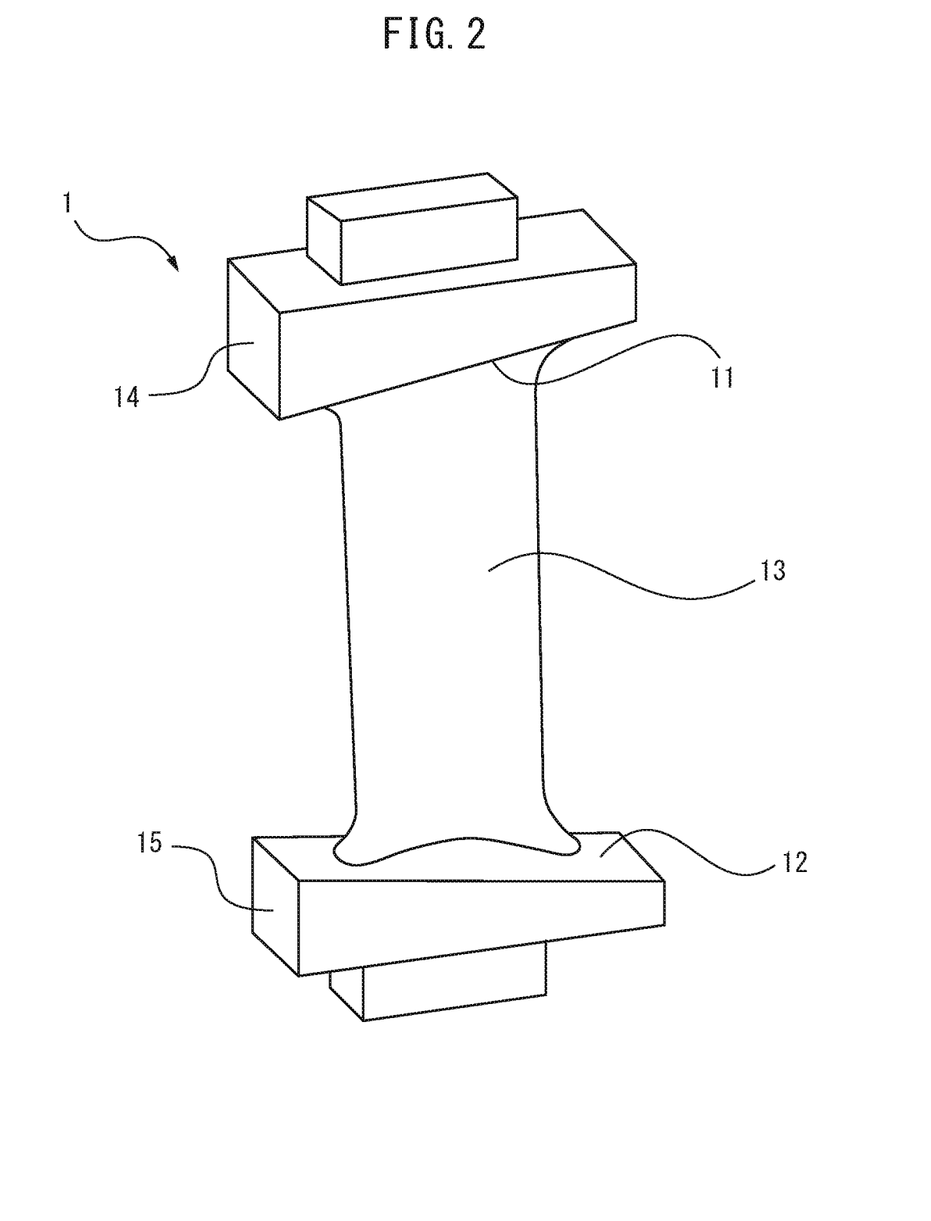
FIG. 2 is a perspective view showing an example of a workpiece for which a tool path is generated by the method of the present disclosure.

FIG. 2 is a perspective view showing an example of a workpiece for which a tool path is generated by the method of the present disclosure. The method of the present disclosure is suitable for the machining of a workpiece 1 having conflicting surfaces 11, 12 which are not parallel to each other, as shown in FIG. 2. Note that the method of the present disclosure is not limited to the machining of such a workpiece having conflicting surfaces which are not parallel to each other, but may be applicable to various workpieces.

The workpiece 1 can be, for example, a blade included in a turbine. The workpiece 1 can comprise, for example, an elongate main body 13 which is machined into a blade, and a pair of retention parts 14, 15 connected to both ends of the main body 13. The main body 13 has a curved flat shape. The ends of the main body 13 are not parallel to each other, and thus, the conflicting surfaces 11, 12 of the retention parts 14, 15 connected to the ends of the main body 13 are also not parallel. The retention parts 14, 15 can be gripped during the machining of the main body 13.

Figure 3:
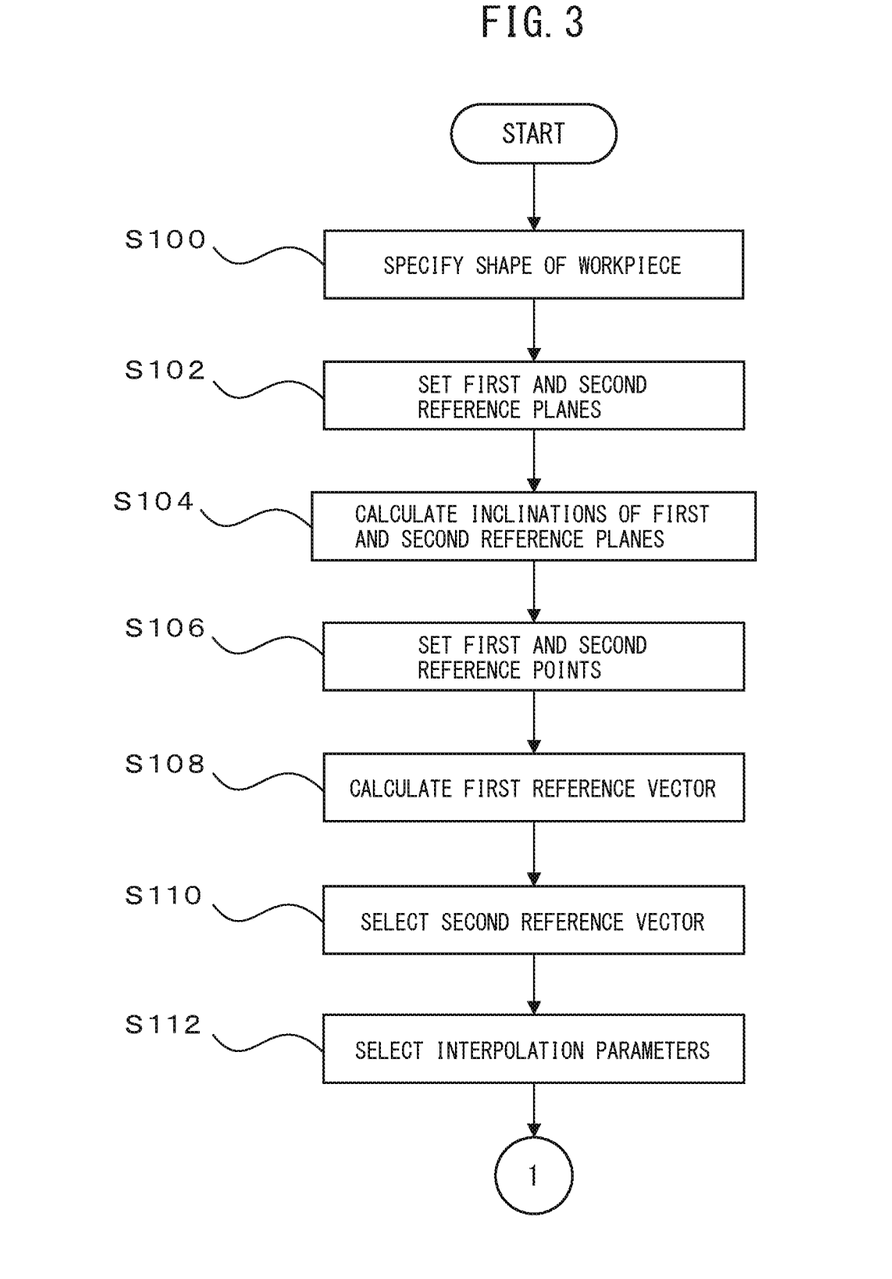
FIG. 3 is a flowchart showing a part of the steps of the method of the present disclosure.
Figure 5:
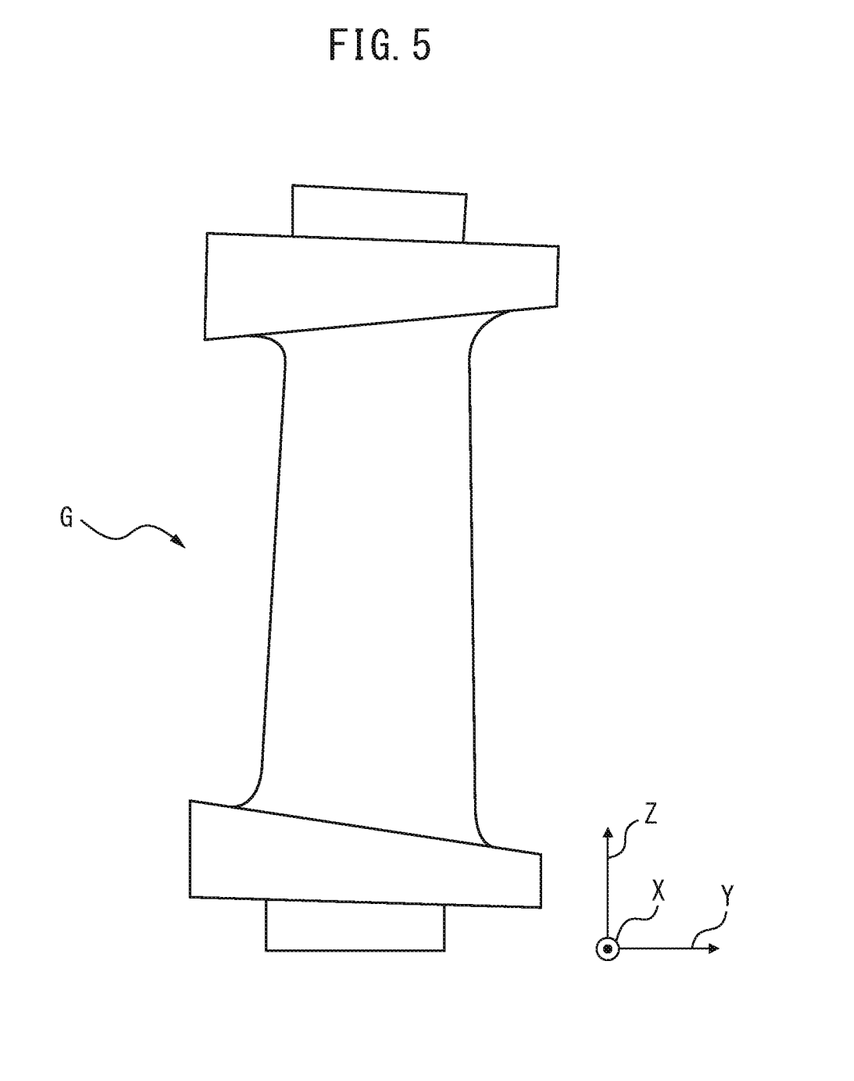
FIG. 5 is a side view showing the workpiece of FIG. 1.

FIG. 3 is a flowchart illustrating the method of the present disclosure. The method of the present disclosure can be executed by, for example, the processor 52 of the device 50 while an operator views the workpiece 1 shown on the display device 53. In the method of the present disclosure, first, the shape of the workpiece is specified (step S100). Specifically, FIG. 5 is a side view showing the workpiece of FIG. 1, and in step S100, the shape G of the workpiece 1 generated by a CAD (Computer Aided Design) system can be read by the CAM system. The shape G includes shape data such as points, edges, and surfaces included on the workpiece. The shape G can be defined in the XYZ coordinate system, which is a three-dimensional orthogonal coordinate system.

Figure 6:
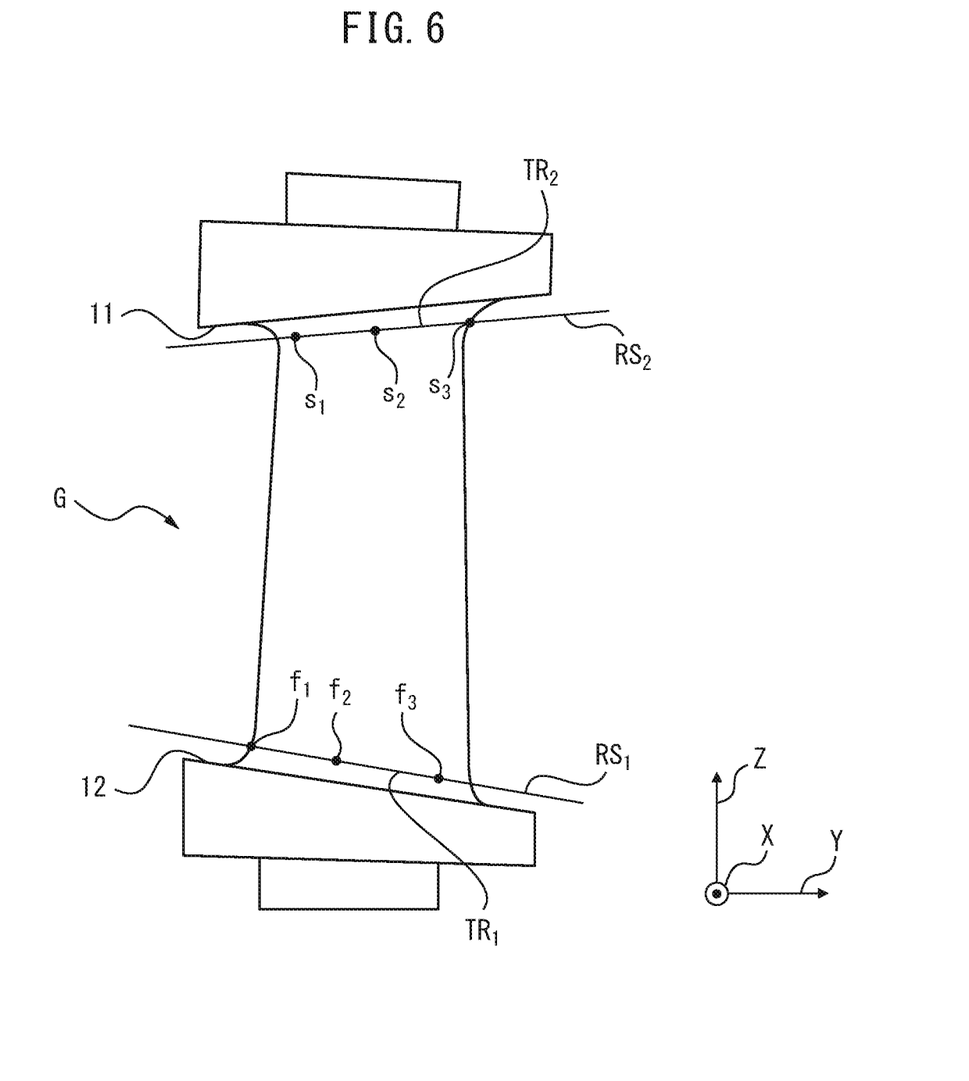
FIG. 6 is a side view showing the setting of a first reference plane and a second reference plane.

Referring again to FIG. 3, next, a first reference plane and a second reference plane are set with respect to the shape to be machined (step S102). Specifically, FIG. 6 is a side view showing the setting of the first reference plane and the second reference plane. The operator can select three points $f_1$, $f_2$, $f_3$ near one surface 12 on the shape G shown on the display device 53, so that a triangle $TR_1$ is obtained in a plane which is substantially parallel to the surface 12. The plane including the triangle $TR_1$ is set as the first reference plane $RS_1$. Likewise, the operator can select three points $s_1$, $s_2$, $s_3$ near the other surface 11 on the shape G shown on the display device 53, so that a triangle $TR_2$ is obtained in a plane which is substantially parallel to the surface 11. The plane including the triangle $TR_2$ is set as the second reference plane $RS_2$. Each point $f_1$, $f_2$, $f_3$, $s_1$, $s_2$, $s_3$ has an X coordinate value, a Y coordinate value, and a Z coordinate value.

Figure 7:
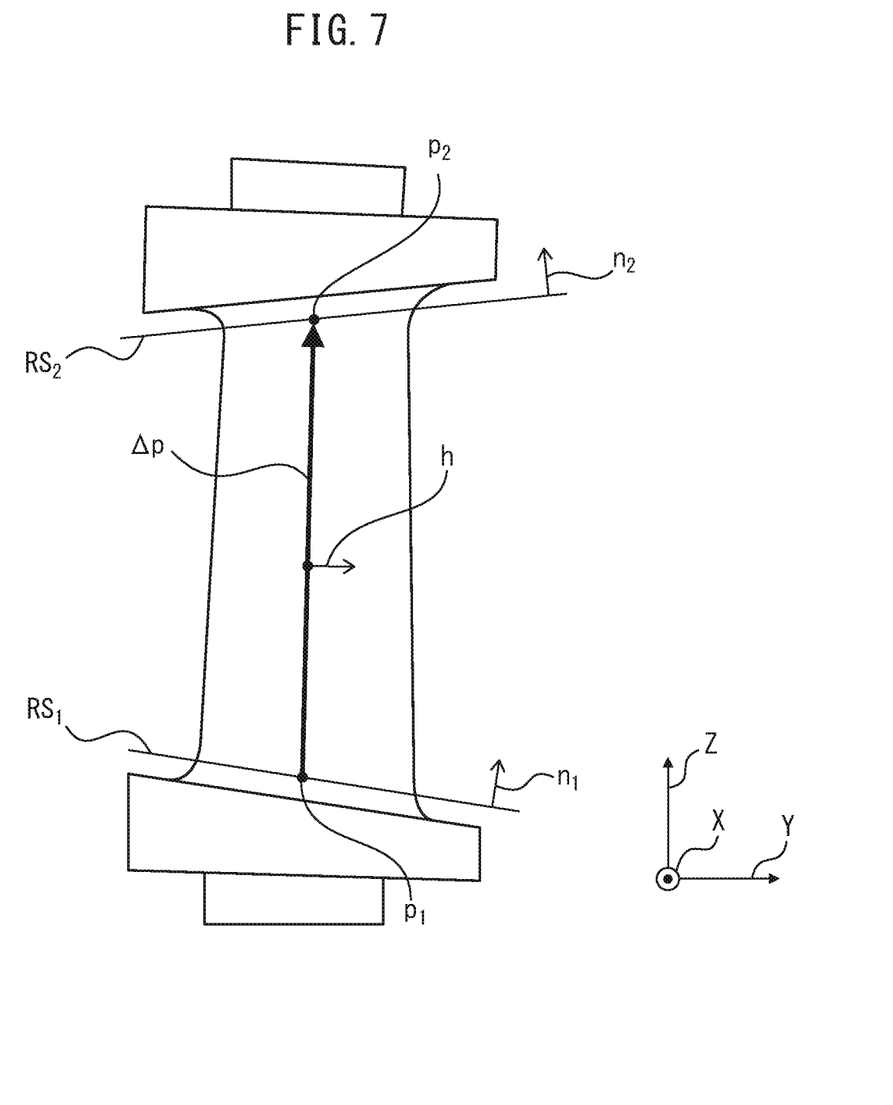
FIG. 7 is a side view showing the calculating of the inclination of the first reference plane and the inclination of the second reference plane.

Referring again to FIG. 3, next, the inclination of the first reference plane and the inclination of the second reference plane are calculated (step S104). Specifically, FIG. 7 is a side view showing the calculation of the inclination of the first reference plane and the inclination of the second reference plane. The processor 52 calculates the normal direction $n_1$ of the first reference plane $RS_1$ by substituting the coordinate values of points $f_1$, $f_2$, $f_3$ described above into the following formula (1). Likewise, the processor 52 calculates the normal direction $n_2$ of the second reference plane $RS_2$ by substituting the coordinate values of points $s_1$, $s_2$, $s_3$ described above into the following formula (2).

[Math 1]

$$n_1 = (f_2 - f_1) \times (f_3 - f_1) \tag{1}$$

[Math 2]

$$n_2 = (s_2 - s_1) \times (s_3 - s_1) \tag{2}$$

Referring again to FIG. 3, next, a first reference point and a second reference point are set (step S106). Specifically, referring to FIG. 7, the operator can select one arbitrary point on the first reference plane $RS_1$ in the shape G shown on the display device 53, and the selected point is set as the first reference point $p_1$. Likewise, the operator can select one arbitrary point on the second reference plane $RS_2$ in the shape G shown on the display device 53, and the selected point is set as the second reference point $p_2$. For example, the operator can select a point which is in substantially the center of the cross-section of the shape G along the first reference plane $RS_1$ as the first reference point $p_1$. Likewise, the operator can select a point which is in substantially the center of the cross-section of the shape G along the second reference plane $RS_2$ as the second reference point $p_2$. Each point $p_1$, $p_2$ has an X coordinate value, a Y coordinate value, and a Z coordinate value.

Referring to FIGS. 3 and 7, next, the processor 52 calculates a vector (hereinafter also referred to as the first reference vector) $\Delta p$ directed from the first reference point $p_1$ toward the second reference point $p_2$ by substituting the coordinate values of points $p_1$, $p_2$ into the following formula (3) (step S108).

[Math 3]

$$\Delta p = \begin{bmatrix} \Delta p_x \\ \Delta p_y \\ \Delta p_z \end{bmatrix} = p_1 - p_2 \qquad (3)$$

Next, the processor 52 selects a vector (hereinafter also referred to as the second reference vector) h which is orthogonal to the first reference vector $\Delta p$ by any suitable method (step S110). For example, the second reference vector h can be calculated by the following formulas (4), (5).

[Math 4]

$$h' = \begin{bmatrix} h'_x \\ h'_y \\ h'_z \end{bmatrix} = \begin{cases} \begin{bmatrix} 0 \\ \Delta p_z \\ -\Delta p_y \end{bmatrix}, & \Delta p_x < \Delta p_y \cap \Delta p_x < \Delta p_z \\ \begin{bmatrix} \Delta p_y \\ -\Delta p_x \\ 0 \end{bmatrix}, & \Delta p_x < \Delta p_y \cap \Delta p_x \geq \Delta p_z \\ \begin{bmatrix} \Delta p_z \\ 0 \\ -\Delta p_x \end{bmatrix}, & \Delta p_x \geq \Delta p_y \cap \Delta p_y < \Delta p_z \\ \begin{bmatrix} \Delta p_y \\ -\Delta p_x \\ 0 \end{bmatrix}, & \Delta p_x \geq \Delta p_y \cap \Delta p_y \geq \Delta p_z \end{cases} \qquad (4)$$

[Math 5]

$$h = \frac{h'}{\|h'\|} \qquad (5)$$

Figure 8:
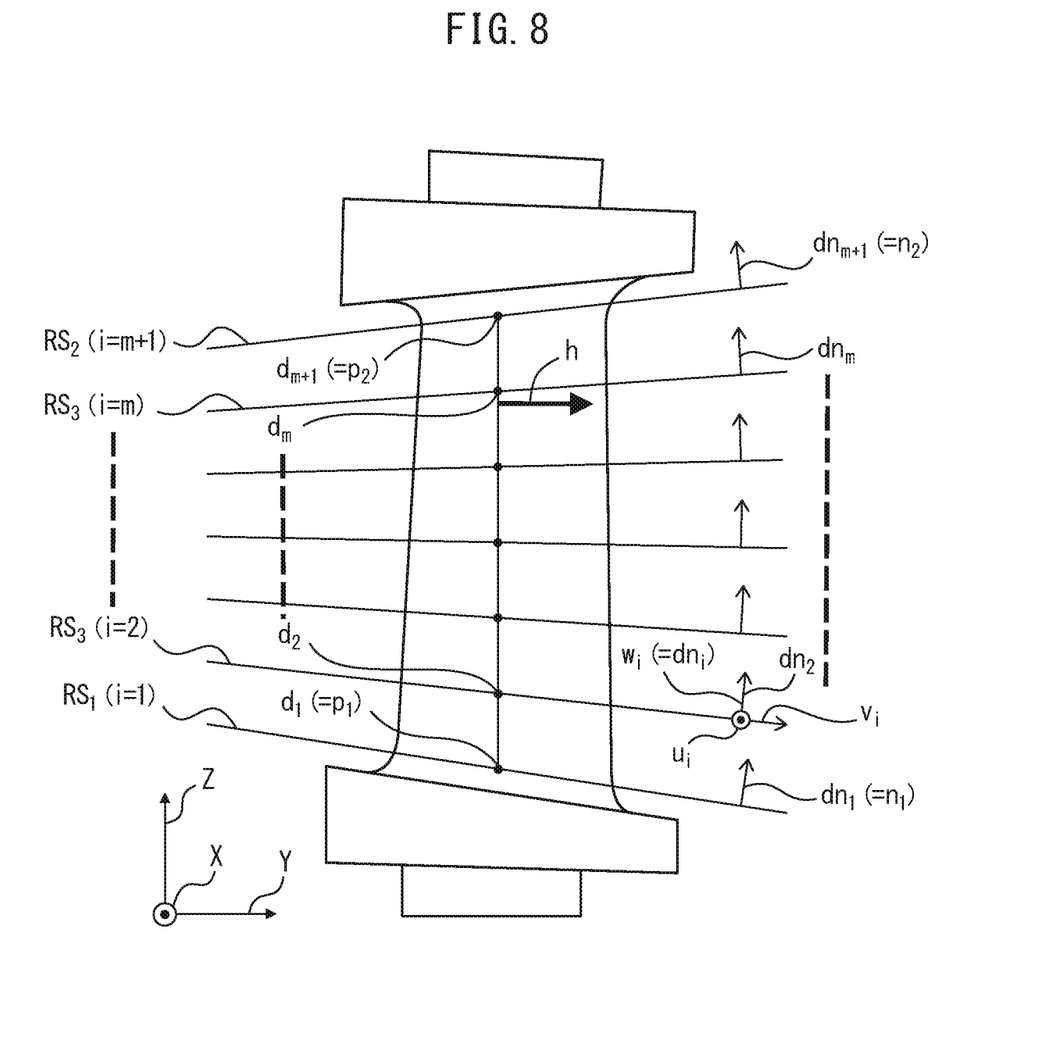
FIG. 8 is a side view showing the interpolation of a plurality of third reference planes between the first reference plane and the second reference plane.

Next, referring again to FIG. 3, the user selects interpolation parameters $t_1, t_2, \ldots t_i$ (i is an integer from 1 to m+1) for interpolation between the first reference plane $RS_1$ and the second reference plane $RS_2$ (step S112). Specifically, FIG. 8 is a side view showing interpolation of a plurality of third references planes between the first reference plane and the second reference plane, m is a value indicating how many sections the shape G is divided into between the first reference plane $RS_1$ and the second reference plane $RS_2$, and m−1 third reference planes $RS_3$ which are not parallel to each other are interpolated between the first reference plane $RS_1$ and the second reference plane $RS_2$. For example, when a plurality of third reference planes $RS_3$ are interpolated between the first reference plane $RS_1$ and the second reference plane $RS_2$, m can be an integer of 3 or more.

For example, as shown in FIG. 8, when the shape G is evenly divided into a plurality of sections (six sections in FIG. 8) between the first reference plane $RS_1$ and the second reference plane $RS_2$, the interpolation parameter $t_i$ can be calculated by the following formula (6).

[Math 6]

$$t^i = \frac{i-1}{m} \qquad (6)$$

The interpolation parameter $t_1$ is a parameter for the first reference plane $RS_1$, the interpolation parameter $t_{m+1}$ is a parameter for the second reference plane $RS_2$, and the interpolation parameters $t_2$ to $t_m$ are parameters for the plurality of third reference planes $RS_3$. Note that the shape G between the first reference plane $RS_1$ and the second reference plane $RS_2$ may be unevenly divided into a plurality of sections. For example, a portion having a shape which changes greatly along the first reference vector $\Delta p$ may be finely divided as compared with other portions. For example, after the operator has evenly divided the shape G between the first reference plane $RS_1$ and the second reference plane $RS_2$ into a plurality of sections as described above, the interpolation parameters $t_1, t_2, \ldots t_i$ may be corrected and/or new interpolation parameters may be inserted, after any of the steps shown below. Furthermore, the interpolation parameters $t_1, t_2, \ldots t_i$ may be calculated by a non-linear function in place of formula (6) above.

Next, the processor 52 executes the following steps S114 to S126 with respect to all of the interpolation parameters $t_1, t_2, \ldots t_i$.

Figure 4:
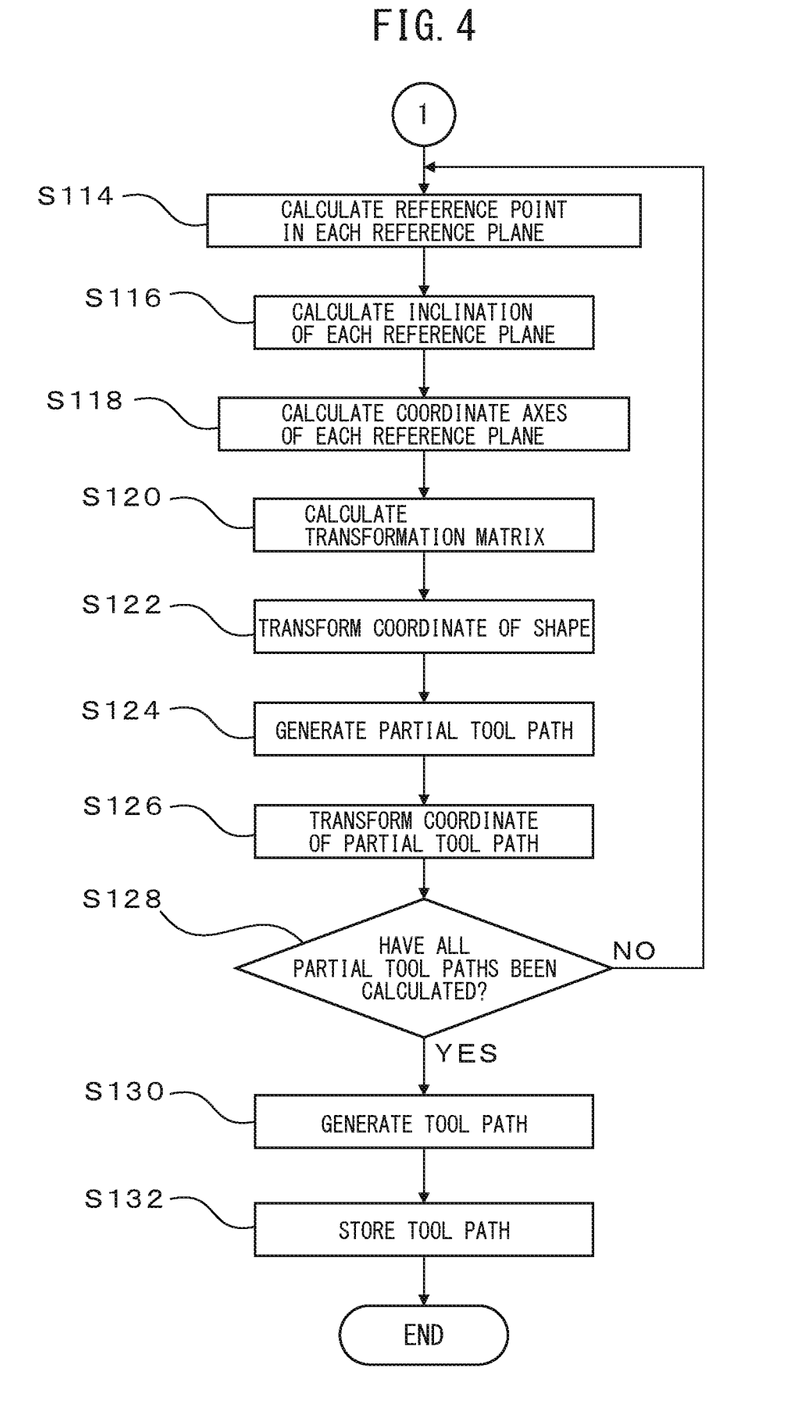
FIG. 4 is a flowchart showing the steps subsequent to FIG. 3.

FIG. 4 is a flowchart illustrating the steps subsequent to those of FIG. 3. The processor 52 calculates a reference point $d_i$ of each reference plane by the following formula (7) using the interpolation parameter $t_i$ (step S114).

[Math 7]

$$d_i = p_1 - (p_1 - p_2)t^i \qquad (7)$$

Note that as shown in FIG. 8, reference point $d_1$ corresponds to the above first reference point $p_1$ of the first reference plane $RS_1$, and reference point $d_{m+1}$ corresponds to the above second reference point $p_2$ of the second reference plane $RS_2$. The reference points $d_2$ to $d_m$ are set as the third reference points of the third reference planes $RS_3$. Each reference point $d_i$ has an X coordinate value $d_{xi}$, a Y coordinate value $d_{yi}$, and a Z coordinate value $d_{zi}$.

Next, the processor 52 calculates the inclination (normal direction) $dn_i$ of each reference plane by the following formula (8) for spherical interpolation between the normal direction $n_1$ of the first reference plane $RS_1$ and the normal direction $n_2$ of the second reference plane $RS_2$ using interpolation parameter $t_i$ (step S116).

[Math 8]

$$dn_i = \text{slerp}(n_1, n_2, t_i) \qquad (8)$$

Note that as shown in FIG. 8, normal direction $dn_1$ corresponds to the above normal direction $n_1$ of the first reference plane $RS_1$, and normal direction $dn_{m+1}$ corresponds to the above normal direction $n_2$ of the second reference plane $RS_2$. Normal directions $dn_2$ to $dn_m$ are set as the normal directions of the third references planes $RS_3$. In accordance with the above method, in the present embodiment, a plurality of third inclinations $dn_i$ which are evenly interpolated between the normal direction $n_1$ of the first reference plane $RS_1$ and the normal direction $n_2$ of the second reference plane $RS_2$ are obtained. Note that the plurality of third inclinations $dn_i$ may be calculated by another method, and, for example, may be unevenly interpolated between the normal direction $n_1$ and the normal direction $n_2$.

Next, the processor 52 calculates the coordinate axes $u_i$, $v_i$, $w_i$ of each reference plane by the following formulas (9) to (11) using interpolation parameter $t_i$ (step S118).

[Math 9]
$$u_i = \begin{bmatrix} u_{xi} \\ u_{yi} \\ u_{zi} \end{bmatrix} = \frac{dn_i \times h}{\|dn_i \times h\|} \quad (9)$$

[Math 10]
$$v_i = \begin{bmatrix} v_{xi} \\ v_{yi} \\ v_{zi} \end{bmatrix} = \frac{dn_i \times u_i}{\|dn_i \times u_i\|} \quad (10)$$

[Math 11]
$$w_i = \begin{bmatrix} w_{xi} \\ w_{yi} \\ w_{zi} \end{bmatrix} = \frac{n_i \times v_i}{\|n_i \times v_i\|} \quad (11)$$

As shown in FIG. 8, coordinate axis $u_i$ can be defined as the direction orthogonal to the second reference vector h and the normal direction $dn_i$ of each reference plane. Furthermore, coordinate axis $v_i$ can be defined as the direction orthogonal to the normal direction $dn_i$ of each reference plane and coordinate axis $u_i$. Furthermore, coordinate axis $w_i$ can be defined as the direction orthogonal to coordinate axis $u_i$ of each reference plane and coordinate axis $v_i$. Coordinate axis $w_i$ coincides with the normal direction $dn_i$ of each reference plane. Thus, coordinate axes $u_i$, $v_i$, $w_i$ can be sequentially calculated.

Next, the processor 52 calculates, by the following formula (12), a transformation matrix $M_i$ for transformation from the XYZ coordinate system to the $u_iv_iw_i$ coordinate system of each reference plane (step S120).

[Math 12]
$$M_i = \begin{bmatrix} 1 & 0 & 0 & d_{xi} \\ 0 & 1 & 0 & d_{yi} \\ 0 & 0 & 1 & d_{zi} \\ 0 & 0 & 0 & 1 \end{bmatrix} \begin{bmatrix} u_{xi} & u_{yi} & u_{zi} & 0 \\ v_{xi} & v_{yi} & v_{zi} & 0 \\ w_{xi} & w_{yi} & w_{zi} & 0 \\ 0 & 0 & 0 & 1 \end{bmatrix} \quad (12)$$

Next, the processor 52 transforms all points q included on the shape G in the XYZ coordinate system to points $r_i$ in the $u_iv_iw_i$ coordinate system based on the following formula (13), and calculates the shape $G_i$ in the $u_iv_iw_i$ coordinate system (step S122).

[Math 13]
$$\begin{bmatrix} r_i \\ 1 \end{bmatrix} = \begin{bmatrix} r_{xi} \\ r_{yi} \\ r_{zi} \\ 1 \end{bmatrix} = M_i^{-1} \begin{bmatrix} q \\ 1 \end{bmatrix} = M_i^{-1} \begin{bmatrix} q_x \\ q_y \\ q_z \\ 1 \end{bmatrix} \quad (13)$$

Next, the processor 52 generates partial tool paths $TP'_i$ with respect to the shape $G_i$ based on each reference plane (the first reference plane $RS_1$, the second reference plane $RS_2$, or the third reference plane $RS_3$) (step S124). The partial tool paths $TP'_i$ can be generated by various methods. For example, the partial tool paths $TP'_i$ may be generated by a method for generating each contour in contour machining. Such method includes, for example, the following two methods.

Figure 9:
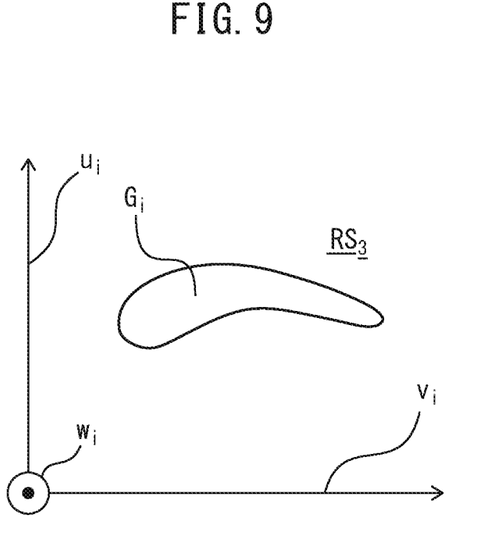
FIG. 9 is a schematic cross-sectional view of the workpiece of FIG. 1 along one of the third reference planes.
Figure 10:
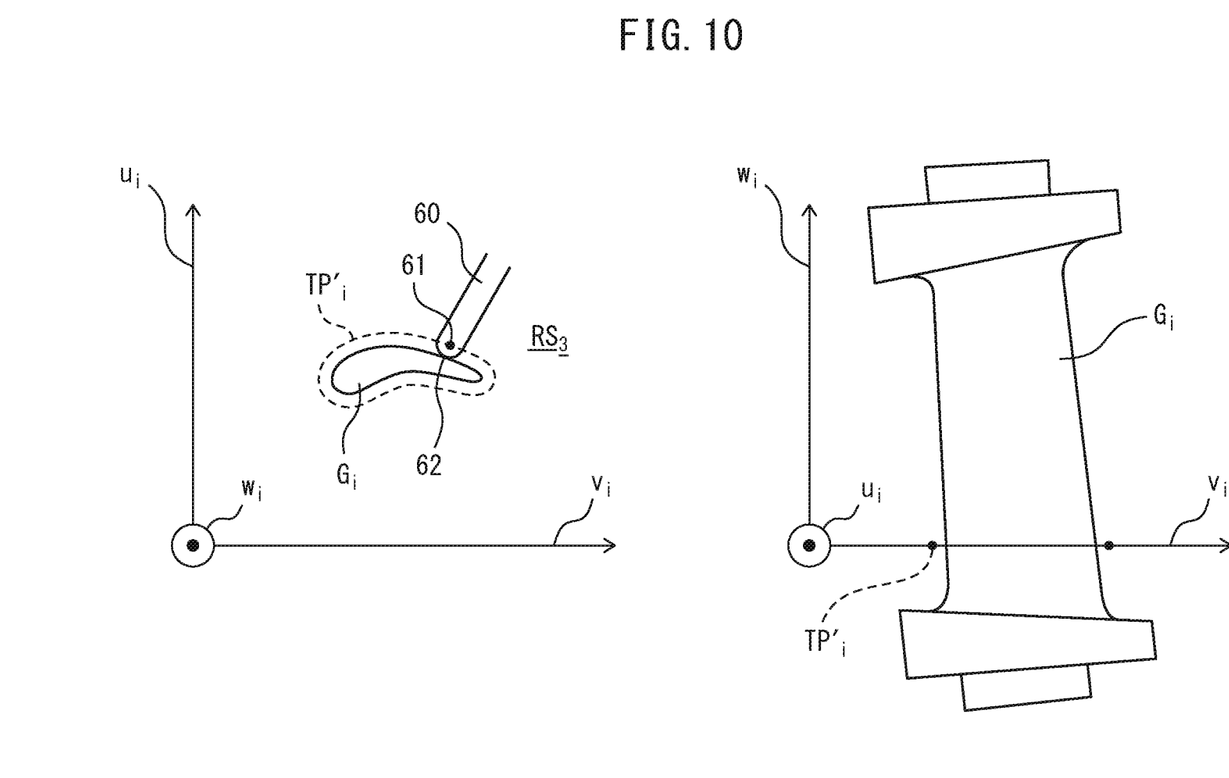
FIG. 10 is a schematic view showing the generation of a partial tool path with respect to the third reference plane of FIG. 9 in the intrinsic coordinate system of this third reference plane.

FIG. 9 is a schematic cross-sectional view of the workpiece of FIG. 1 taken along one of the third reference planes, and FIG. 10 is a schematic view showing the generation of a partial tool path in an intrinsic coordinate system of this third reference plane of FIG. 9. In NC machining, a tool reference point 61 is set on a tool 60, and the NC machining is controlled so that the tool reference point 61 follows the generated partial tool path $TP'_i$. The tool reference point 61 can be set, for example, in the radial center of the tool 60.

In the first method, the partial tool path $TP'_i$ can be generated by calculating a contact position 62 between the shape $G_i$ and the tool 60 so that the above tool reference point 61 is located in the corresponding reference plane $RS_3$. In this case, the partial tool path $TP'_i$ is located in the reference plane $RS_3$, while the contact position 62 may not be present in the reference plane $RS_3$, depending on the shape $G_i$.

In the second method, the partial tool path $TP'_i$ can be generated by offsetting the contour of Gi by the distance between the contact position 62 between the shape $G_i$ and the tool 60 and the above tool reference point 61 so that the contact position 62 is located within the corresponding reference plane $RS_3$. In this case, the contact position 62 is located in the reference plane $RS_3$, while each partial tool path $TP'_i$ may not be present in the reference plane $RS_3$, depending on the shape $G_i$.

Figure 11:
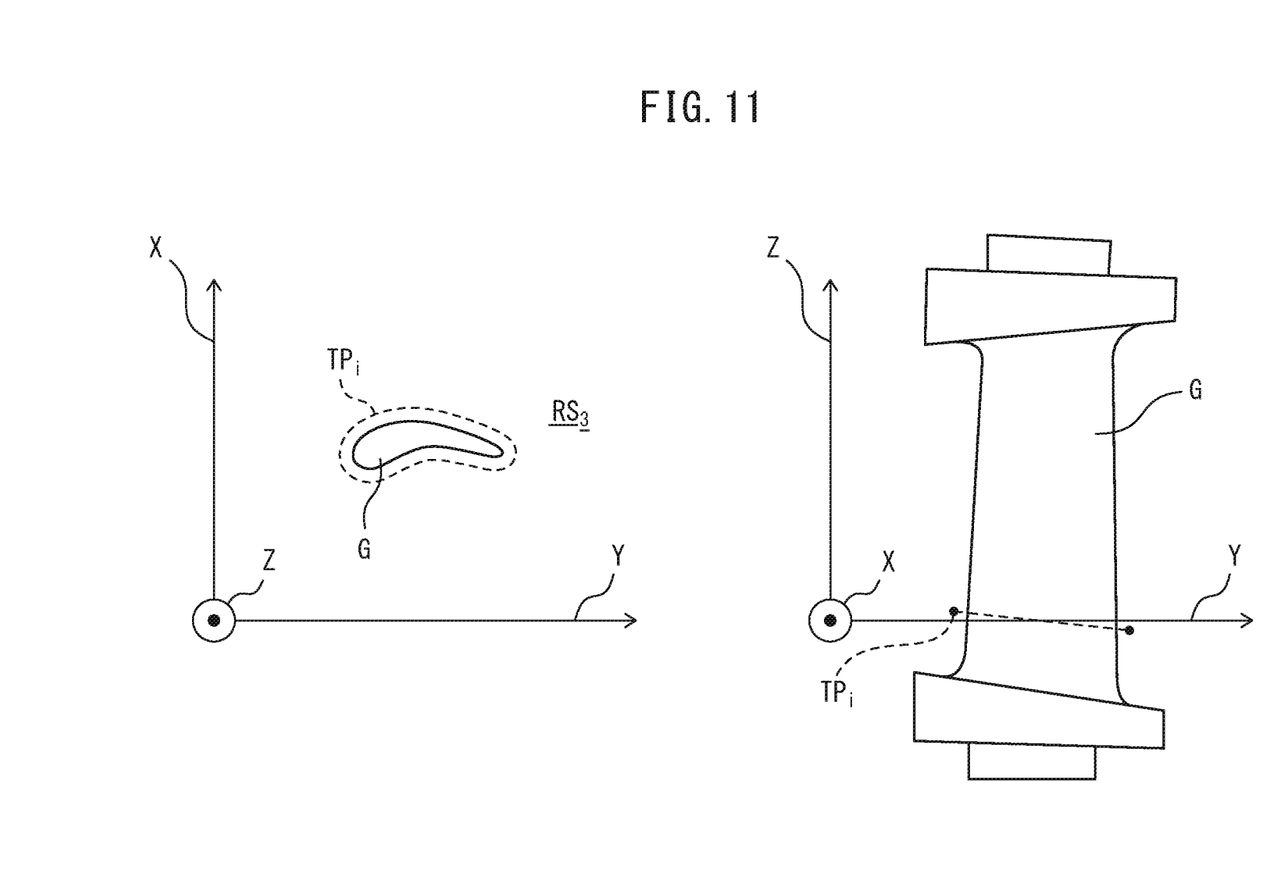
FIG. 11 is a schematic view showing the changing of the partial tool path of FIG. 10 to the reference coordinate system of the entirety of the workpiece.

FIG. 11 is a schematic view showing the changing of the partial tool path of FIG. 10 to the reference coordinate system of the entirety of the workpiece. Referring to FIGS. 3 and 11, next, the processor 52 converts all of the points ji included on the partial tool path $TP'_i$ in the $u_iv_iw_i$ coordinate system to points $k_i$ in the XYZ coordinate system, based on the following formula (14), and calculates the partial tool path $TP_i$ in the XYZ coordinate system (step S126).

[Math 14]
$$\begin{bmatrix} k_i \\ 1 \end{bmatrix} = \begin{bmatrix} k_{xi} \\ k_{yi} \\ k_{zi} \\ 1 \end{bmatrix} = M_i \begin{bmatrix} j_i \\ 1 \end{bmatrix} = M_i \begin{bmatrix} j_{xi} \\ j_{yi} \\ j_{zi} \\ 1 \end{bmatrix} \quad (14)$$

Next, the processor 52 judges whether or not partial tool paths $TP_i$ have been calculated with respect to all of the interpolation parameters $t_1, t_2, \ldots t_i$ (step S128). When all of the partial tool paths $TP_i$ have been calculated, the tool path is generated by sequentially connecting all of the partial tool paths $TP_i$ (step S130). When all of the partial tool paths $TP_i$ have not been calculated, the process returns to step S114.

Figure 12:
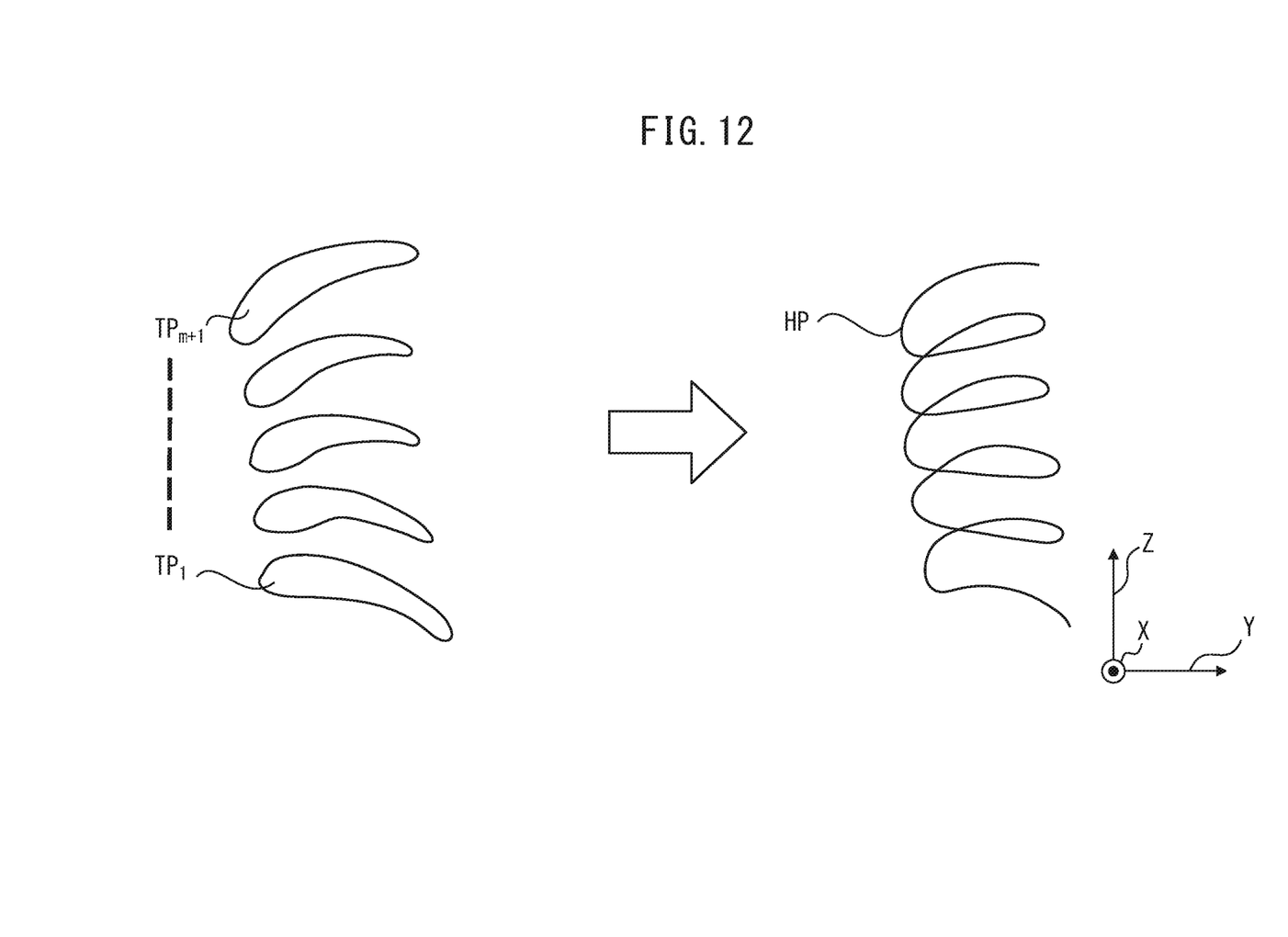
FIG. 12 is a schematic view showing the generation of a tool path by connecting a plurality of partial tool paths.

FIG. 12 is a schematic view showing the generation of the tool path by connecting the plurality of partial tool paths. The plurality of partial tool paths $TP_i$ can be connected by various methods. For example, in FIG. 12, a helical tool path HP is generated by smoothly connecting adjacent partial tool paths $TP_i$ to each other. Note that the phrase "helical tool path" encompasses both a tool path in which an area of the tool path HP on the XY plane is constant along the Z-axis (i.e., a path along a cylindrical surface), and a path in which an area of the tool path HP on the XY plane changes along the Z-axis (for example, a path along a conical surface).

Next, the processor 52 stores the generated tool path in the storage device 51 (step S132), and the series of operations ends.

According to the method of the present disclosure as described above, a plurality of third reference planes $RS_3$ which are not parallel to each other are set with respect to the workpiece 1, and a plurality of partial tool paths $TP_i$ which are not parallel to each other are generated based on the plurality of third reference planes $RS_3$. Thus, parallel partial tool paths $TP_i$ can be set with respect to each of the conflicting surfaces 11, 12 which are not parallel to each other. Therefore, a tool path which is suitable for a workpiece 1 having conflicting surfaces 11, 12 which are not parallel to each other can be generated.

Furthermore, in the method of the present disclosure, the tool 60 has a tool reference point 61 which follows the tool path, and each partial tool path $TP_i$ can be generated by calculating the contact position 62 between the workpiece 1 and the tool 60 so that the tool reference point 61 is in the corresponding third reference plane $RS_3$. In this case, the partial tool paths $TP_i$ can be generated based on the tool reference point 61.

Furthermore, in the method of the present disclosure, each partial tool path $TP_i$ may be generated by offsetting the contour of the workpiece 1 by a distance between the contact position 62 between the workpiece 1 and the tool 60 and the tool reference point 61 so that the contact position 62 is located in the corresponding third reference plane $RS_3$. In this case, the partial tool paths $TP_i$ can be generated based on the contact position 62.

Furthermore, in the method of the present disclosure, the first reference plane $RS_1$ has a first inclination $n_1$, the second reference plane $RS_2$ has a second inclination $n_2$, and the method comprises a step of setting the first reference point $p_i$ with respect to the first reference plane $RS_1$ and a step of setting the second reference point $p_2$ with respect to the second reference plane $RS_2$. Furthermore, the step of interpolation of the plurality of third reference planes $RS_3$ comprises determining the plurality of third reference planes $RS_3$ so that the plurality of third reference planes $RS_3$ include a plurality of third reference points $d_2$ to $d_m$ which are evenly interpolated between the first reference point $p_1$ and the second reference point $p_2$, and the plurality of third reference planes $RS_3$ have a plurality of third inclinations $dn_2$ to $dn_m$ which are evenly interpolated between the first inclination $n_i$ and the second inclination $n_2$. Further, the step of generating the tool path includes generating a helical tool path HP by smoothly connecting the partial tool paths $TP_i$ of adjacent third reference planes $RS_3$. Thus, a smooth tool path can be generated.

Though the embodiments of the method for generating a tool path have been described, the present invention is not limited to the embodiments described above. A person skilled in the art would understand that various modifications can be made to the embodiments described above. Furthermore, a person skilled in the art could understand that the steps of the method described above may be performed in a different order than that described above, as long as no contradiction arises.

For example, in the embodiments above, the partial tool paths $TP_i$ are generated with respect to all of the reference planes including the first reference plane $RS_1$ and the second reference plane $RS_2$. However, partial tool paths $TP_i$ may be generated with respect to only the third reference planes $RS_3$. Furthermore, the partial tool paths $TP_i$ may be generated with respect to only two or more consecutive third reference planes $RS_3$ among the plurality of third reference planes $RS_3$.

Furthermore, in the embodiments above, the helical tool path HP is generated by smoothly connecting adjacent partial tool paths $TP_i$. However, the plurality of partial tool paths $TP_i$ may be connected by another method. For example, a stepwise tool path connected by a connection path parallel to the Z-axis may be generated.

REFERENCE SIGNS LIST 1 workpiece
60 tool
61 tool reference point
62 contact position
$d_2$ to $d_m$ third reference point
$dn_2$ to $dn_m$ normal direction (third inclination)
HP tool path
$n_1$ normal direction (first inclination)
$n_2$ normal direction (second inclination)
$p_1$ first reference point
$p_2$ second reference point
$RS_1$ first reference plane
$RS_2$ second reference plane
$RS_3$ third reference plane
$TP_i$ partial tool path

The invention claimed is:

1. A tool path generation method for generating a tool path for machining a workpiece, the method comprising the steps of:
   setting a first reference plane with respect to the workpiece,
   setting a second reference plane that is not parallel to the first reference plane, with respect to the workpiece,
   interpolating, based on the first reference plane and the second reference plane, a plurality of third reference planes that are not parallel to each other, between the first reference plane and the second reference plane,
   generating, with respect to each of the plurality of third reference planes, a partial tool path for machining the workpiece, based on the corresponding third reference plane, and
   generating a tool path by sequentially connecting the partial tool paths of the plurality of third reference planes.

2. The tool path generation method according to claim 1, wherein
   a tool has a tool reference point that follows the tool path, and
   each partial tool path is generated by calculating a contact position between the workpiece and the tool so that the tool reference point is positioned within the corresponding third reference plane.

3. The tool path generation method according to claim 1, wherein
   a tool has a tool reference point which follows the tool path, and
   each partial tool path is generated by offsetting a contour of the workpiece by a distance between a contact position between the workpiece and the tool and the tool reference point so that the contact position is within the corresponding third reference plane.

4. The tool path generation method according to claim 1, wherein
   the first reference plane has a first inclination, the second reference plane has a second inclination,
the method further comprises the steps of:
setting a first reference point with respect to the first reference plane, and
setting a second reference point with respect to the second reference plane,
the step of interpolating the plurality of third reference planes comprises:
determining the plurality of third reference planes so that the plurality of third reference planes include a plurality of third reference points that are evenly interpolated between the first reference point and the second reference point, and the plurality of third reference planes have a plurality of third inclinations that are evenly interpolated between the first inclination and the second inclination, and
the step of generating the tool path comprises:
generating a helical tool path by connecting the partial tool paths of adjacent third reference planes.

* * * * *